United States Patent [19]
Sugiyama et al.

[11] 3,864,702
[45] Feb. 4, 1975

[54] LIGHT MEASURING OPTICAL SYSTEM FOR USE IN A REFLEX CAMERA

[75] Inventors: Takahiro Sugiyama; Michiro Oishi, both of Tokyo, Japan

[73] Assignee: Asahi Kogaku Kogyo Kabushiki Kaisha, Tokyo-to, Japan

[22] Filed: Feb. 22, 1974

[21] Appl. No.: 444,722

[30] Foreign Application Priority Data
Mar. 1, 1973   Japan.......................... 48-26156[U]

[52] U.S. Cl. .................................. 354/56, 354/152
[51] Int. Cl. ........................................... G03b 19/12
[58] Field of Search ............ 354/56, 152, 155, 201, 354/225

[56] References Cited
UNITED STATES PATENTS
3,513,759   5/1970   Kondo .................................. 364/56
3,534,671   10/1970  Yamaguchi............................ 354/56
3,563,149   2/1971   Suzuki et al. ......................... 354/56
3,631,784   1/1972   Jurenz.................................. 354/56
3,661,065   5/1972   Yamazaki et al. .............. 354/152 X Primary Examiner—Richard A. Wintercorn
Attorney, Agent, or Firm—Knobbe, Martens, Olson, Hubbard & Bear

[57]   ABSTRACT

In a single lens reflex camera a light measuring optical system characterized by the light information coming out of a pentaprism at two or more exit surface areas being directed by a reflecting mirror again into the same pentaprism and reflected by one or more surfaces of the pentaprism in such a manner that the light information is finally collected in a single spot for detecting the light intensity.

8 Claims, 4 Drawing Figures

LIGHT MEASURING OPTICAL SYSTEM FOR USE IN A REFLEX CAMERA

BACKGROUND OF THE INVENTION

In prior art frame center area priority type light measuring optical systems, the light information has to travel along a long optical path through, in addition to a pentaprism, lenses and other auxiliary prisms before it falls on the detector elements. In such a system those optical elements other than the pentaprism occupy a comparatively large space. This makes it difficult to make a compact light measuring optical system. Consequently this affects the ability to make a more compact camera.

An additional disadvantage to prior art light measuring optical systems is that in order to obtain a stabilized reliable detection of a weak light information, a conventional prior art system had to employ two separate detector elements. This had the drawback of requiring a significant amount of space and also produced additional electric noise.

SUMMARY OF THE INVENTION

According to this invention reflecting mirrors are arranged in contact with or shortly spaced from an exit surface of the pentaprism to thereby reflect the light information again into the same pentaprism. In this way the optical path within the pentaprism can be extended sufficiently while the optical path outside the pentaprism can be shortened remarkably. This enables the saving of space outside the pentaprism and allows the arrangement of other components around the pentaprism without any danger of blocking the optical path.

In the case of obtaining stabilized reliable detection of a weak light information the optical system of this invention causes the light information coming out of the pentaprism to be collected finally in a single spot and, hence, detected with stability by a single detection element. This is also very advantageous in view of economy in space and minimization of electric noise involved.

DETAILED DESCRIPTION OF THE INVENTION

Figure 1:
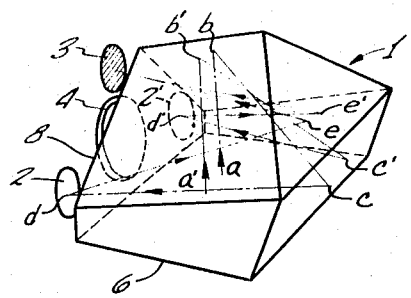
FIG. 1 is a perspective view of the light measuring optical system showing the fundamental embodiment of this invention.

Referring to FIG. 1, light information $a$ and $a'$ is introduced into the light entrance surface 6 of the pentaprism 1 and is reflected at $b$ and $b'$ and $c$ and $c'$ and directed toward the reflecting mirrors 2 and 2' arranged on each side of the eyepiece 4 which is adjacent the exit surface 8 of the pentaprism. The light information $d$ and $d'$ is then reflected by the reflecting mirrors 2 and 2' back into the pentaprism 1 and reflected at $e$ and $e'$ toward a single spot which is occupied by the detector element 3.

Figure 2:
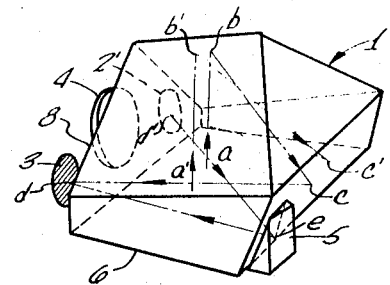
FIG. 2 is an alternative embodiment of the invention utilizing an auxiliary prism and a single reflecting mirror.

With respect to FIG. 2 the auxiliary prism 5 is mounted adjacent the pentaprism 1. The light information $a$ and $a'$ entering the pentaprism is again reflected at $b$ and $b'$ and $c$ and $c'$ with the light at $c'$ exiting the exit surface 8 of the pentaprism adjacent the reflecting mirror 2 and being reflected at $d$ back into the pentaprism to the auxiliary prism 5. The light information $d$ is reflected within the auxiliary prism 5 at $e$ back to a single spot on the exit surface 8 of the pentaprism into the detector element 3. The light reflected at $c$ is directed straight to the single spot on the exit surface 8 of the pentaprism where the detector element 3 is situated.

Figure 3:
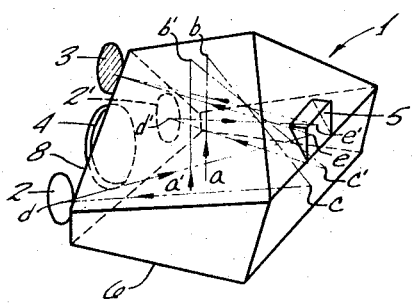
FIG. 3 is an alternative embodiment of the invention with an auxiliary prism and two reflecting mirrors.
Figure 4:
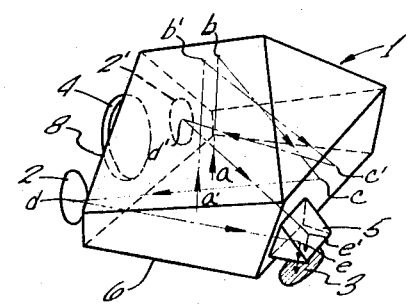
FIG. 4 is an alternative embodiment of the invention with the detector element adjacent the auxiliary prism.

In FIG. 3 the auxiliary prism is mounted adjacent the pentaprism opposite the reflecting mirrors 2 and 2' and the detector element 3. In FIG. 4 the auxiliary prism 5 is mounted adjacent the pentaprism 1 opposite the reflector mirrors 2 and 2', but adjacent the detector element 3 which is also mounted opposite the reflector mirrors 2 and 2'.

It should be noted that a light measuring optical system of such a construction as described above makes it possible to shorten the optical path outside of the pentaprism and requires only a single detector element. Consequently, the whole system can be made compact.

What is claimed is:

1. A light measuring optical device for use with a reflex camera, said device comprising:
    a pentaprism mounted on said camera, said pentaprism having a first surface for receiving said light and a second surface for exiting said light;
    a reflecting mirror mounted adjacent said second surface of said pentaprism, said reflecting mirror diverting said light back into said pentaprism; and
    a detector element for measuring light intensity mounted adjacent said pentaprism to receive said light after it has been diverted back into said pentaprism.

2. A light measuring optical device as defined in claim 1 additionally comprising an auxiliary prism mounted adjacent said pentaprism wherein said pentaprism is situated between said auxiliary prism and said reflecting mirror, resulting in said light leaving said mirror traveling through said pentaprism to said auxiliary prism for diversion to said detector element.

3. A light measuring optical device as defined in claim 2 wherein said detector element is mounted adjacent said auxiliary prism on the same side of said pentaprism 4. A light measuring mechanism in a single lens reflex camera, said mechanism comprising:
    a pentaprism mounted within said camera for receiving said light in two phases, said pentaprism having a light entrance surface and a light exit surface, said light entrance surface receiving the first phase of light;
    a reflector mirror mounted adjacent said light exit surface of said pentaprism to direct said first phase of light leaving said exit surface back into said pentaprism representing the second phase of light entering said pentaprism; and
    a detector element mounted adjacent said exit surface to receive said second phase of light when it departs said pentaprism to measure light intensity.

5. A light measuring device for use in a single lens reflex camera, said device comprising:
    a pentaprism set within said camera for directing the light image received within said camera;

means mounted adjacent said pentaprism for diverting said light image leaving said pentaprism back into said pentaprism; and means adjacent said pentaprism for detecting the intensity of said light image leaving said pentaprism after having been diverted back into said pentaprism wherein the length of travel of said light image after entering said pentaprism for the light measuring operation is confined within said pentaprism, eliminating any additional space requirements within the camera to accommodate the travel of said light for said light measuring operation.

6. A light measuring device for use in a single lens reflex camera as defined in claim 5, wherein said diverting means comprises a reflector mirror and wherein said detecting means comprises a detector element.

7. A light measuring optical system for use in a reflex camera, said system comprising:

a pentaprism mounted within said camera for receiving light information which has entered said camera, said pentaprism having a plurality of surfaces, said light information being reflected off more than one of said surfaces and exiting said pentaprism through an exit surface;

a reflector mirror mounted adjacent said exit surface of said pentaprism to reflect said exiting light information back into said pentaprism, said light information being reflected off more than one surface a second time; and a detector element for receiving said light information in a single spot after said light information has been reflected within said pentaprism said second time.

8. A light measuring optical system for use in a reflex camera, said system comprising:

a pentaprism mounted within said camera for receiving light information which has entered said camera, said pentaprism having a plurality of surfaces, said light information being reflected off more than one of said surfaces and exiting said pentaprism through an exit surface;

a reflector mirror mounted adjacent said exit surface of said pentaprism to reflect said exiting light information back into said pentaprism, said light information being reflected off more than one surface a second time, said reflector mirror diverting said light information back into said pentaprism a second time in such a manner that said light information, after being reflected off at least one of said surfaces of said pentaprism, will exit said exit surface at a single spot; and a detector element for receiving said light information in said single spot after said light information has been reflected within said pentaprism said second time.

* * * * *